H. N. EAVENSON, F. D. BUFFUM & J. E. FLEXNER.
MINING MACHINE.
APPLICATION FILED JUNE 4, 1909.
1,011,928.
Patented Dec. 19, 1911.
9 SHEETS—SHEET 3.
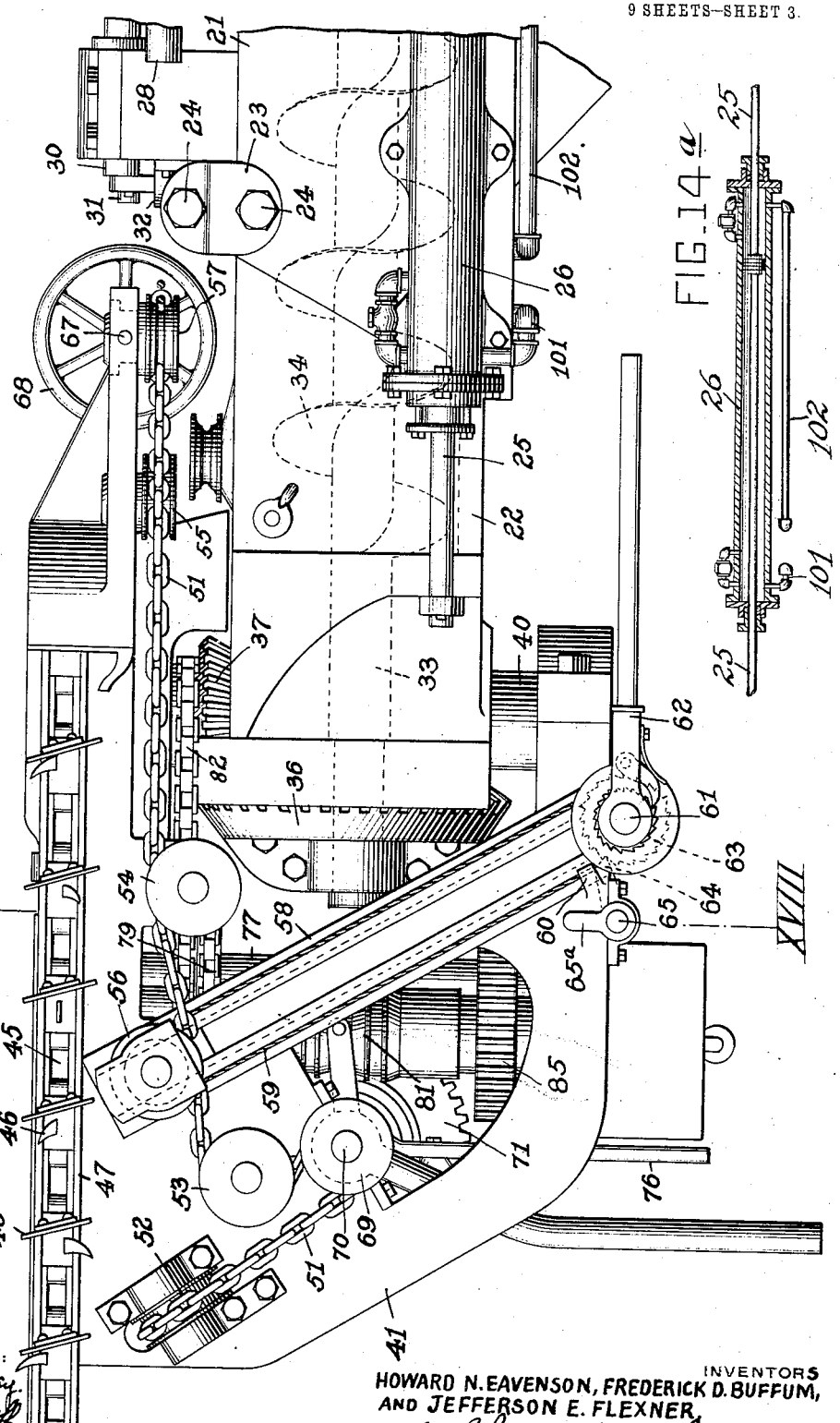
INVENTORS
HOWARD N. EAVENSON, FREDERICK D. BUFFUM,
AND JEFFERSON E. FLEXNER,
by Christy and Christy
Atty's H. N. EAVENSON, F. D. BUFFUM & J. E. FLEXNER.
MINING MACHINE.
APPLICATION FILED JUNE 4, 1909.
1,011,928.
Patented Dec. 19, 1911.
9 SHEETS—SHEET 4.
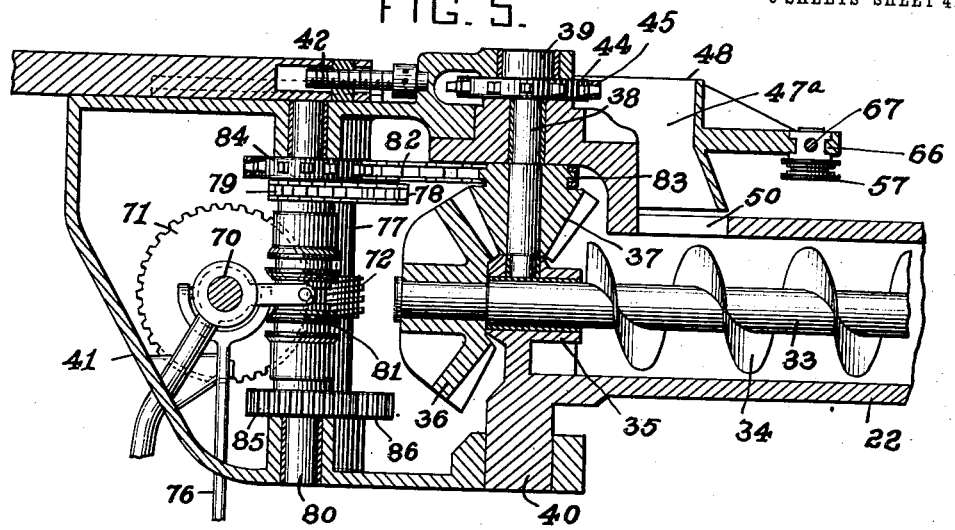
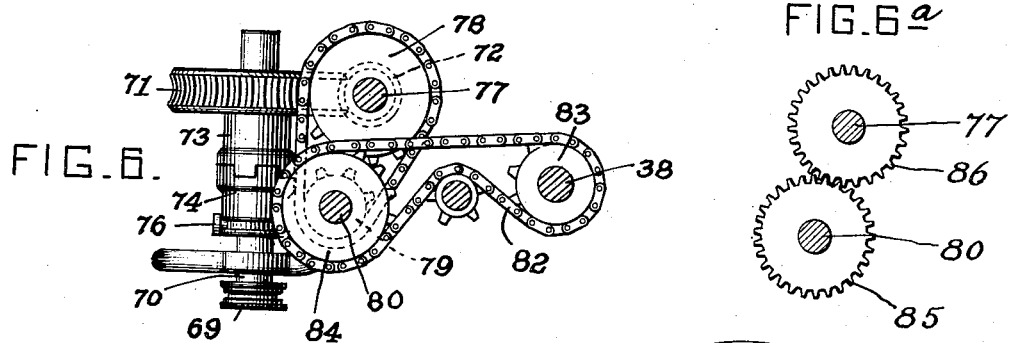
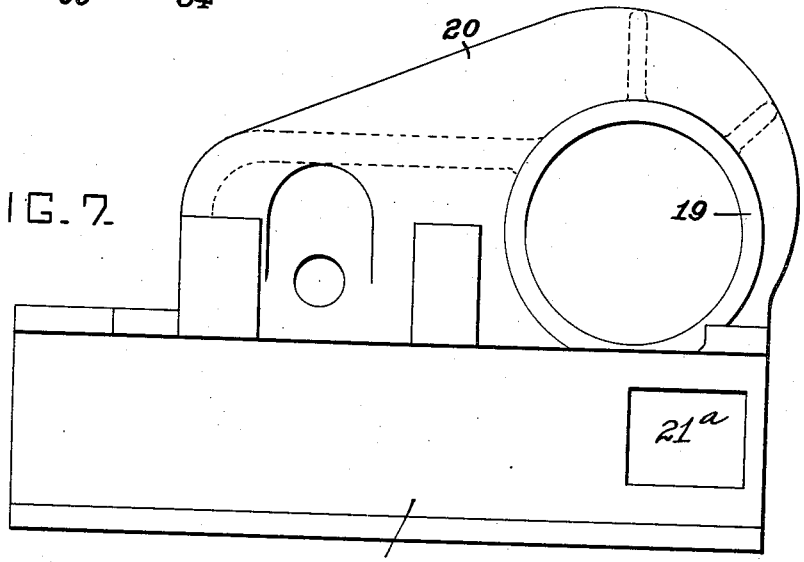
WITNESSES:
J. Herbert Bradley
Theodore Huff
INVENTORS
HOWARD N. EAVENSON, FREDERICK D. BUFFUM,
AND JEFFERSON E. FLEXNER,
by Christy and Christy
Atty's

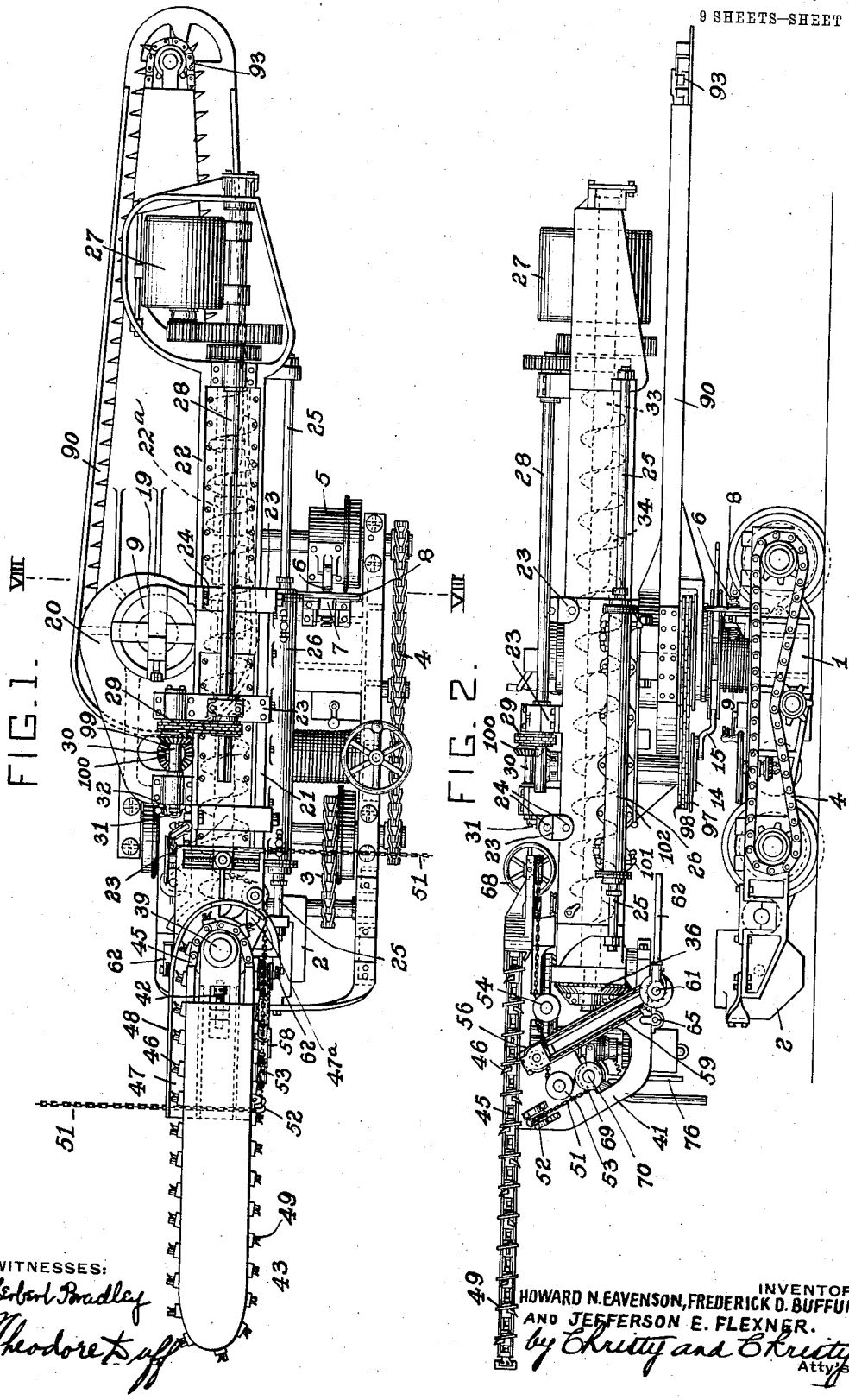

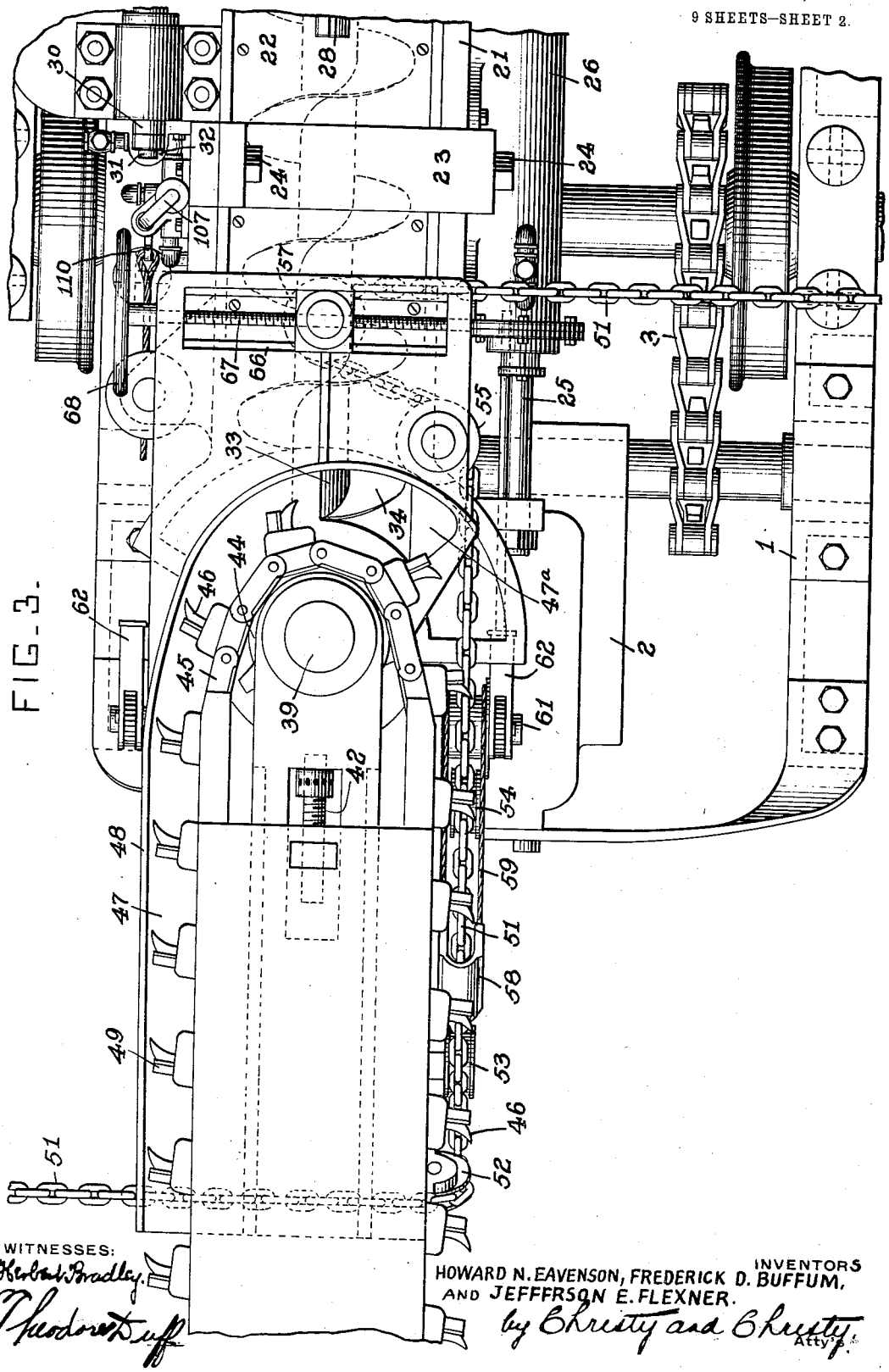

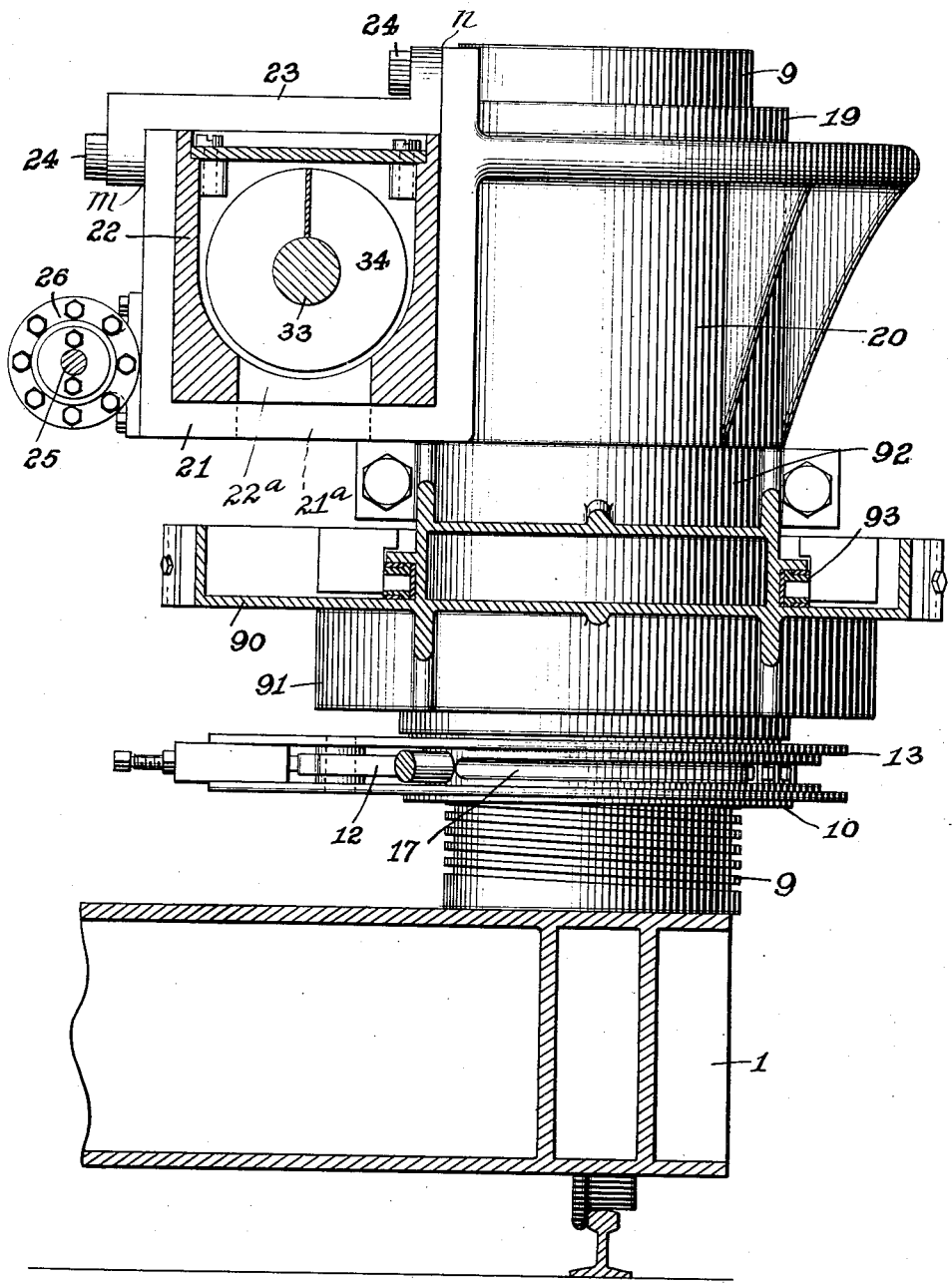

H. N. EAVENSON, F. D. BUFFUM & J. E. FLEXNER.
MINING MACHINE.
APPLICATION FILED JUNE 4, 1909.
1,011,928.
Patented Dec. 19, 1911.
9 SHEETS—SHEET 6.
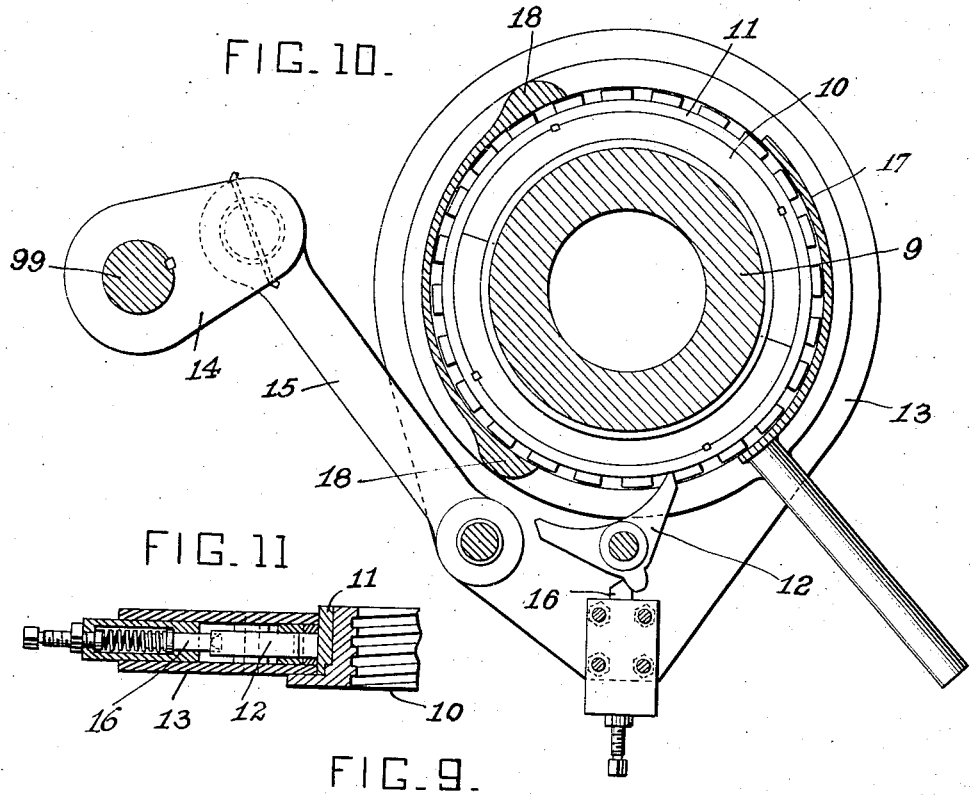
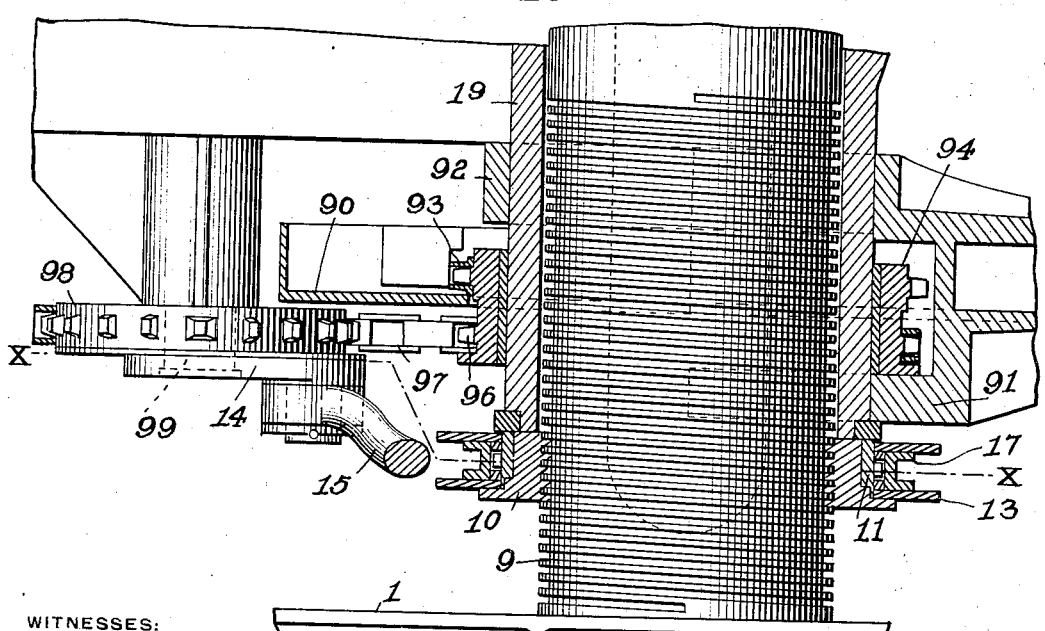

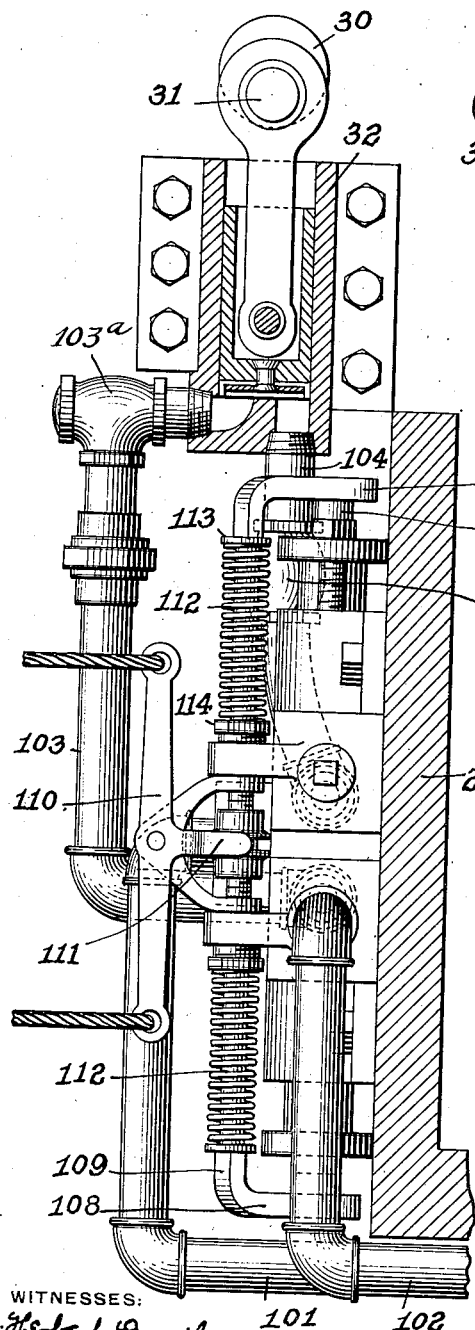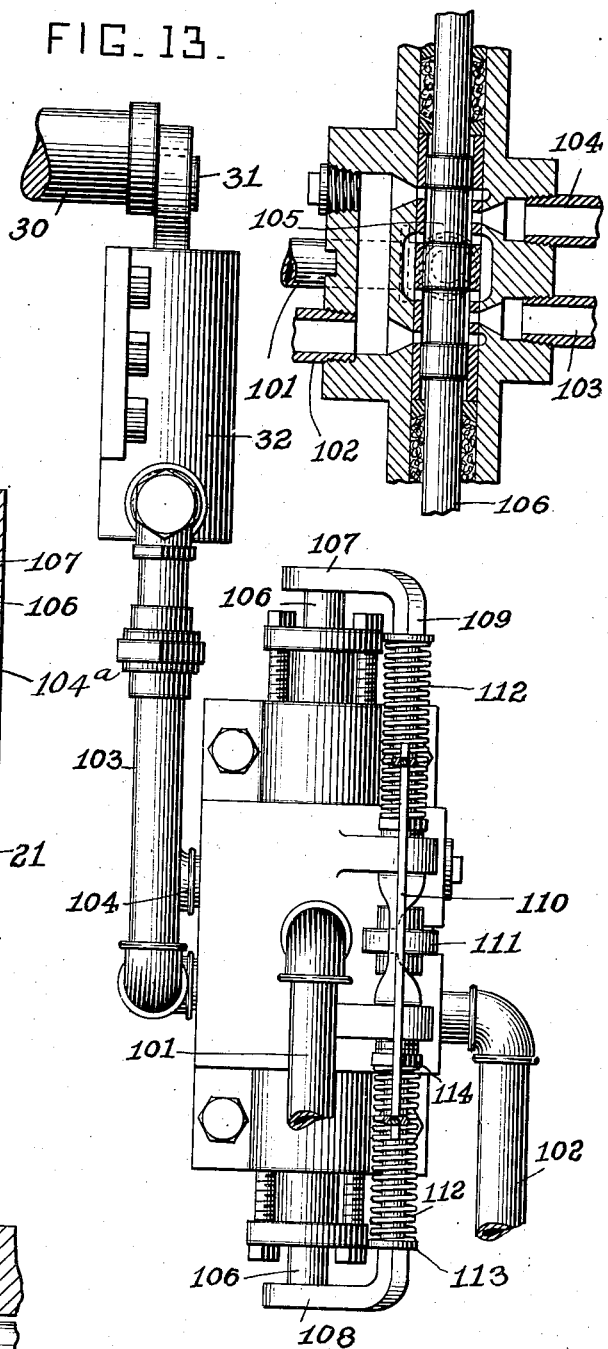

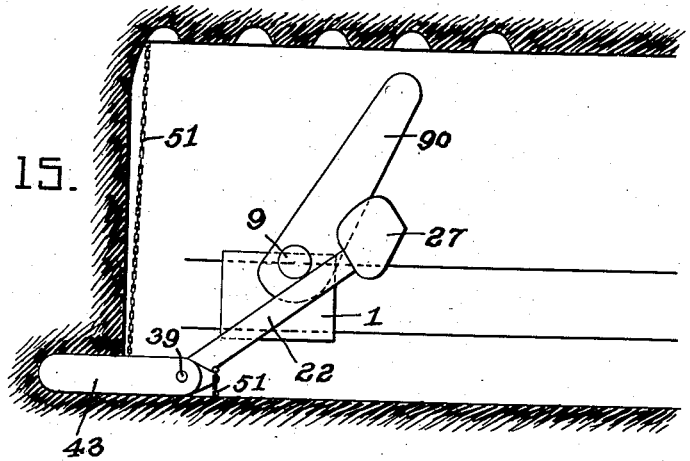
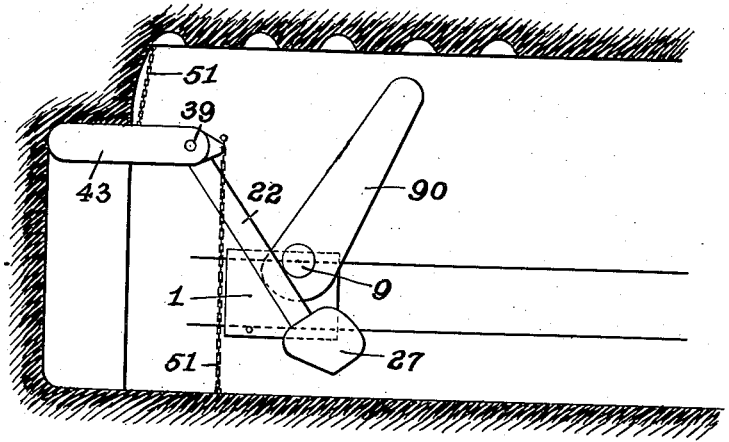
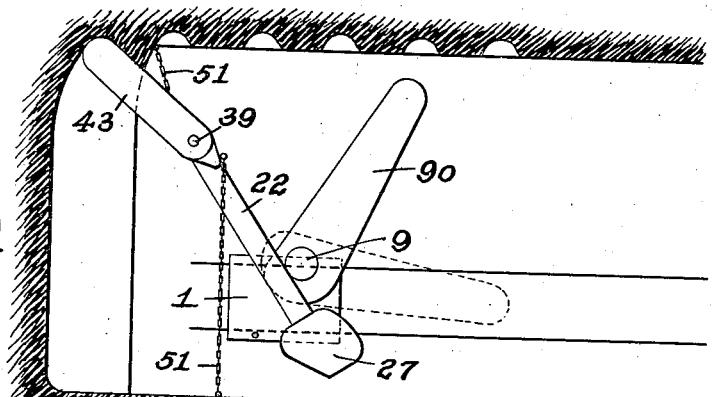

H. N. EAVENSON, F. D. BUFFUM & J. E. FLEXNER.
MINING MACHINE.
APPLICATION FILED JUNE 4, 1909.

1,011,928.

Patented Dec. 19, 1911.
9 SHEETS—SHEET 9.

WITNESSES:
J. Herbert Bradley
Theodore Duff

INVENTOR
HOWARD N. EAVENSON, FREDERICK D. BUFFUM
AND JEFFERSON E. FLEXNER
Bayard H. Chutty
Atty's

UNITED STATES PATENT OFFICE.

HOWARD N. EAVENSON, FREDERICK D. BUFFUM, AND JEFFERSON E. FLEXNER, OF GARY, WEST VIRGINIA, ASSIGNORS, BY DIRECT AND MESNE ASSIGNMENTS, TO UNITED STATES COAL & COKE COMPANY, OF WELCH, WEST VIRGINIA, A CORPORATION OF WEST VIRGINIA.

MINING-MACHINE.

1,011,928.  Specification of Letters Patent.  Patented Dec. 19, 1911.

Application filed June 4, 1909. Serial No. 500,189.

*To all whom it may concern:*

Be it known that we, HOWARD N. EAVENSON, FREDERICK D. BUFFUM, and JEFFERSON E. FLEXNER, residing at Gary, in the county of McDowell and State of West Virginia, citizens of the United States, have invented or discovered certain new and useful Improvements in Mining-Machines, of which improvements the following is a specification.

The invention described herein relates to certain improvements in mining machines, and has for its object a construction whereby a horizontal cut may be made across the face of the coal at any desired height, the depth of such cut being approximately uniform and its length variable at will between wide limits, without changing the position of the machine.

The invention is hereinafter more fully described and claimed.

Figure 18:
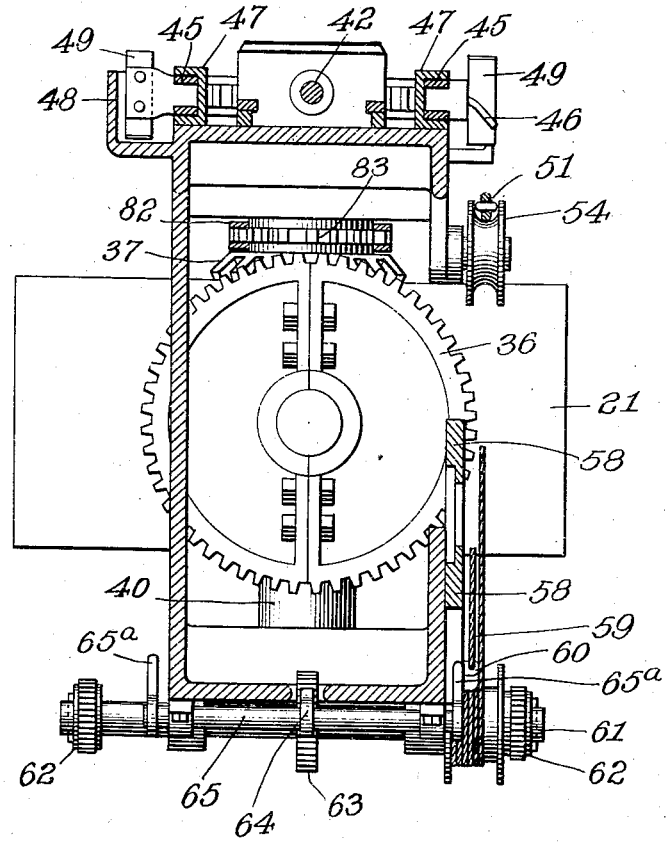
Figure 19:
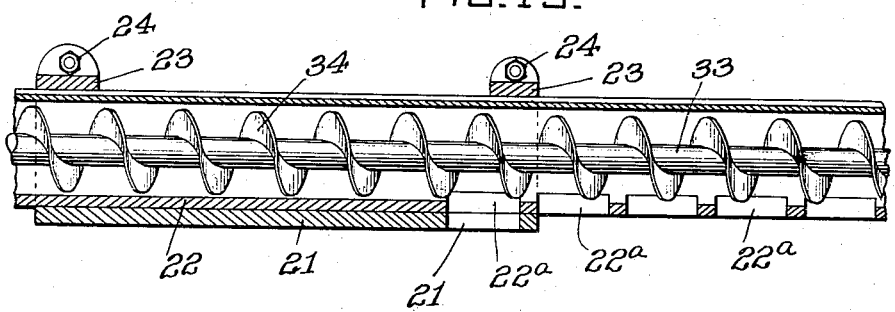

In the accompanying drawings forming a part of this specification, Figure 1 is a top plan view of our improved machine; Fig. 2 is a side elevation of the same; Fig. 3 is a plan view on an enlarged scale of the portion of the machine in front of the supporting pillar, and showing a portion of the cutter head; Fig. 4 is a side elevation of the portion shown in Fig. 3; Fig. 5 is a sectional view of the front end of the conveyer arm, and the rear portion of the cutter head; Fig. 6 is a detail view illustrating mechanism for shifting the cutter head; Fig. 6ª is a sectional detail of the same parts, but on another plane; Fig. 7 is a plan view of the carrier frame on which is mounted the cutting mechanism and conveyer; Fig. 8 is a sectional elevation on a plane indicated by the line VIII—VIII Fig. 1; Fig. 9 is a sectional elevation of the supporting pillar and portions of the parts carried thereby; Fig. 10 is a sectional plan view on a plane indicated by the line X—X Fig. 9; Fig. 11 is a sectional detail view of the adjustable pawl; Figs. 12 and 13 show in two side elevations the valve mechanism and connected parts controlling the movements of the conveyer arm; Fig. 14 is a sectional view of the valve itself; Fig. 14ª is a longitudinal section through the fluid pressure cylinder 26; Figs. 15, 16 and 17 are diagrammatic views illustrating the operation of our improved machine; Fig. 18 is a vertical section taken on the line XVIII—XVIII of Fig. 4, showing the means of controlling the tension pulley; and Fig. 19 is a vertical section taken through part of the spiral conveyer and shows its plurality of discharge orifices.

In the practice of our invention, the mining mechanism and conveyers as hereinafter described are mounted upon a suitable base or support, such as the motor truck or carriage 1, which can be driven by any suitable means, preferably by an electric motor 2, having its shaft connected by a sprocket chain 3 to one of the axles of the truck. It is preferred that the two axles of the truck should be connected together by a sprocket chain 4, so that all the wheels will be driven. The movements of the truck are controlled by any suitable brake, such for example as a strap 5 passing around a drum on one of the axles and having one end securely anchored while the opposite end, which is connected to a threaded rod 6, engages a rotatable nut 7 provided with an operating handle 8. On this truck is sustained a cutter-support. This cutter support consists of a frame, pivoted in the truck, and an arm extensible with relation to the frame. The manner of pivoting is shown in the drawings. A vertical shaft or column 9 is secured in the truck 1; this column has its lower portion threaded, and on this threaded portion is mounted a nut 10, preferably made in sections, as clearly shown in Fig. 10. The sections of this nut are secured within a band 11 having teeth on its periphery, with which a double pawl 12 can engage, for the purpose of rotating the nut. The pawl 12 is pivotally mounted upon a pawl-carrier in the form of the rotatable ring 13, supported by the nut, and adapted to be reciprocated by means of a crank 14, to which the ring is connected by a link 15. As shown in Fig. 10, the pawl is so constructed that either point can be yieldingly held in engagement with the teeth on the band 11, by means of a spring actuated pin 16. The pawl can be shifted as required to bring either point in engagement with the teeth on the band. An annular shield 17 is fitted loosely around outside of the ends of the teeth on the toothed band 11, such shield having oppositely arranged openings through which the points of the pawl can engage the teeth, as hereinafter described. By shifting the shield from a position in which it offers no interference to the normal action of the pawl, the closed parts thereof may be interposed to a greater or less extent between the pawl and the teeth, so that in its reciprocation the pawl will, through some or all of its traverse, simply slide along the surface of the shield, thus limiting or entirely preventing the movement of the nut without stopping the operation of the operating crank 14.

Shoulders or abutments 18 are formed on the shield in such position that, by shifting the shield, these abutments can be brought into the path of the operative point of the pawl during a portion of the movement of the latter, so that, on its return movement, the pawl will not engage the teeth in the band for the full length of its stroke. By this means the amount of movement imparted to the nut can be varied without changing the stroke of the pawl. These projections or abutments 18 may be made of such a height that when forced under one point of the pawl by the rotation of the shield, the pawl will be reversed in position so that the opposite point will engage the teeth at an open place in the shield. A metal barrel 19 surrounds the column 9 and rests upon the nut 10. Integral with this barrel is formed a guide frame 20, clearly shown in Figs. 1 and 7, such frame preferably extending forward the greater distance beyond the column. This frame is provided with a trough-shaped portion 21, in which is arranged a hollow arm 22, movable longitudinally in the trough portion 21. In order to prevent the arm 22 from tipping in the cradle or trough shaped portion, brackets 23 extend across the trough above the arm. These brackets may be attached to the trough by means of bolts 24 (see Fig. 8) constructed to shear on a predetermined strain. Referring to Fig. 8 it will be apparent that the shearing referred to will be in a plane indicated by the letters "m" and "n." By the employment of such shearable bolts, an overloading of the front end of the arm 22 as hereinafter described will only result in the shearing of the bolts and the tipping of this arm, without injury to the other parts of the machine. The hollow arm 22 has attached thereto, at points adjacent to its ends, the ends of a rod 25, extending through a fluid pressure cylinder 26 secured to the side of the trough portion 21 of the frame 20. Within this cylinder the rod is provided with a suitable piston, and the ends of the cylinder are connected respectively to a pump mechanism hereinafter described, the connection between the pump and the ends of the cylinder being controlled by a suitable valve mechanism, whereby at one time the fluid is drawn from one end of the cylinder and forced into the other, thereby moving the hollow arm in one direction, and, on a reversal of the valve mechanism, the flow of fluid is also reversed, so that the hollow arm will be forced in an opposite direction. A motor 27 is secured in suitable supports at the rear end of the hollow arm, and a driving connection from the front shaft of this motor extends to a shaft 28, extending above the hollow arm and having its front end supported in suitable bearings on one of the brackets 23. This shaft is connected, preferably by sprocket wheels and chains 29, to a counter shaft 30, mounted in suitable bearings on the carrier frame 20. As the hollow arm carrying the motor and shaft 28 are movable relative to the carrier frame, the shaft 28 is movable through the sprocket wheel forming one member of the driving connection to the counter shaft. This shaft 30 is provided at its front end with a crank pin 31, adapted to be connected to the piston of a pump 32, as clearly shown in Fig. 12, whereby the circulation of fluid heretofore described can be obtained. The back shaft of the motor 27 has a driving connection with a shaft 33 having spiral conveyer blades 34 formed or secured thereon, said shaft and blades extending through the hollow arm 22 to the front end thereof. The forward end of the shaft 33 is mounted in a bearing 35 at the front end of the arm 22. On this shaft is secured a beveled pinion 36 intermeshing with a corresponding pinion 37 on a vertical shaft 38. This shaft has an enlarged portion 39 at its upper end serving as one of the trunnions for the cutter head, the other trunnion 40 being formed integral with the arm 22 on its lower side. On these trunnions is mounted the inner section 41 of the cutter-head. The outer section 43 of the cutter head is adjustably supported on the inner section, the adjustment being effected by means of a screw 42, as shown in Figs. 3 and 5. A sprocket wheel 44 is secured on the shaft 38, and around this sprocket passes an endless chain 45, carrying cutters 46. This chain passes around the guide wheel at the forward end of the outer section 43; and, below the path of movement of the chain and cutter, a shelf 47, having a retaining rib or flange 48, is provided. In addition to the cutters, and in the rear thereof, the chain is provided with wings or sweeps 49, which will cause the pieces of coal removed by the cutters to move along the shelf 47 to an opening 47ª in the rear of the section 41 of the cutter head, and thence into the conveyer arm 22, along which it will be carried by the spiral blades or the shaft 33. The opening 50 in the upper wall of the trough 22 is made of such dimensions and such shape that the passage 47ª will register with such opening in the various positions to which the cutter head will be shifted relative to the conveyer 22, as hereinafter described.

In order to shift the cutter head on the trunnions, a traction chain 51 has its ends secured in any suitable manner when the machine is in operation, at points adjacent to the side walls of the entry, heading, or chamber. This chain 51 is engaged by a traction grip carried in the cutter-head. This traction grip consists of guide pulleys or sheaves 52, 53, 54, and 55, tension pulleys or sheaves 56 and 57, and a driving pulley or sheave, 69. The tension pulley 56 is mounted in a guideway or frame 58, and is adapted to be shifted along the same by any suitable means, such for example as a rope 59, having one end secured as at 60 and passing around the sheave 56 or its supporting block, the opposite end being attached to a drum on shaft 61. This shaft is adapted to be rotated by a hand-operated lever 62 loosely mounted on the shaft 61 and provided with a pawl engaging a suitable ratchet wheel on the shaft. To prevent a backward movement of the shaft 61 when the lever 62 is raised, a ratchet wheel 63 is also mounted on the shaft 61, and is engaged by a pawl 64 on a shaft 65. In order to operate this tension pulley on either side of the machine, both ends of the shaft 61 have operating levers 62 mounted thereon and the holding pawl, and ratchet 63 is preferably arranged about midway of the length of the shaft. The shaft 65, whereby the pawl 64 is carried, is provided at each end with an operating handle 65ª. The tension pulley 57 is mounted in guideways 66, and is adapted to be shifted by a threaded rod 67 having an operating handle or wheel 68 (see particularly Figs. 3 and 5). The chain 51 also passes around a driving pulley or sheave 69 mounted on a shaft 70. This shaft is adapted to be operated by means of a worm and wheel connection 71, 72 (Fig. 6), the wheel portion 71 being loosely mounted on the shaft 70 and provided with a clutch member 73. The other clutch member 74, which is adapted to be shifted along the shaft by means of a lever 76, is connected thereto, so that when the clutch member 74 is shifted into engagement with member 73, the shaft will be driven with the latter. The screw portion 72 of the screw and wheel connection is formed on the shaft 77, provided with a sprocket wheel 78, which is driven by a chain passing around the sprocket wheel 79 on the shaft 80. The sprocket wheel 79 is loosely mounted on the shaft 80, and is adapted to be connected with the shaft so as to be driven thereby by a clutch having one member integral with or secured to the wheel 79 while the other member is formed on the end of a sleeve 81 suitably mounted on the shaft. The shaft 80 is driven by a sprocket chain 82 from sprocket wheel 83 on the shaft 38, said chain passing around a sprocket wheel 84 on the shaft 80. On the lower end of the shaft 80 is loosely mounted a pinion 85, intermeshing with a pinion 86 on the shaft 77. The pinion 85 is loosely mounted on the shaft 80 and has attached thereon one member of a clutch mechanism, adapted to engage a portion of the double clutch member 81 on said shaft. The double clutch member 81 is movable along the shaft, but is in engagement therewith so as to be driven thereby. When the clutch 81 is shifted, so as to connect the sprocket wheel 79 with the shaft, the shaft 77 will be driven to effect a proper feeding movement of the cutter head. When the motion of the cutter head is to be reversed, the clutch 81 is shifted so as to release the sprocket wheel 79 from the shaft and connect the pinion 85 therewith, so that the shaft 77 will thereafter be driven at a higher rate of speed, and consequently the cutter head will be more rapidly moved away from its work.

As heretofore stated, the material cut will be delivered into the conveyer arm 22 and moved back along the same to suitable openings in the bottom of the trough. The foremost of these openings 22ª in the conveyer arm 22 is so located that it will be in register with an opening 21ª in the bottom of the trough 21 of the carrier frame when the conveyer arm is in its extreme rearward position. The other openings will register in succession with this opening in the bottom of the trough 21 as the conveyer arm is moved outwardly, so that the material is always delivered from this conveyer arm at a fixed point relative to the supporting post or column 9. The succession of openings 22ª through the bottom of conveyer arm 22 is indicated by dotted lines in Fig. 1, and is more clearly shown in Fig. 19. The material drops from the opening of the bottom of the trough 21 to a bed, said bed forming a part of a conveyer 90, adapted to deliver the material at a point outside of the machine, which may be a car, or may be at points along the side of the heading or entry. At its inner end the conveyer 90 is divided (see particularly Fig. 9), and provided with upper and lower seats or bearing surfaces which engage the barrel 19. The lower seat is semi-circular and is designated 91, and the upper (which for structural reasons is made in two parts) is circular and completely surrounds the barrel 19. The lower member 91 of this bearing rests upon a shoulder supported by the nut 10, heretofore described, so that this conveyer will move up and down with the barrel and with the other parts of the mechanism heretofore described. A chain 93 having blades attached thereto is passed around a sprocket wheel 94 which surrounds the barrel 19 and around a second sprocket wheel located at the outer end of the conveyer. The sprocket wheel 94 has a second line of sprockets 96, for engagement with a chain 97 driven by a sprocket wheel 98 on the lower end of a shaft 99 which is driven by suitable gearing 100 from the counter shaft 30, as shown in Figs. 1 and 2. It will be observed by reference to Figs. 1 and 9, that the frame or conveyer 90 is so constructed adjacent to the supporting column that a portion thereof will, in all the relative positions which in the operation of the machine this conveyer and the carrier frame 21 have to each other, be in line with or in position to receive material from the discharge opening in the bottom of the trough 21.

As heretofore stated, a fluid pressure cylinder 26 is secured to one side of the carrier frame, and through this cylinder is passed a rod 25 secured at its ends to the conveyer arm 22 and having attached thereto within the cylinder a piston head. The ends of this cylinder are connected by pipes 101 and 102 to a valve mechanism clearly shown in Figs. 12 and 13, and this valve mechanism is provided with ports connected by pipes 103 and 104 to the pump 32 as clearly shown in Fig. 12. The pipe 103 being the outlet pipe from the pump is provided with a check valve preventing a back flow of the water therethrough. The pipe 104 being the inlet pipe is also provided with a check valve preventing a flow of water from the pump to the valve mechanism. These check valves may be of ordinary construction and may be contained in valve casings 103$^a$ and 104$^a$ placed in the several pipe connections.

In Fig. 14 we have shown the valve 105 in mid position, and when so positioned the fluid will merely circulate through the valve and back to the pump, and the ports to which the pipes 102 and 101 are connected will be subjected to equal pressure. By shifting the valve in one direction, the fluid will be caused to flow through pipe 101 to one end of the cylinder and from the opposite end to pipe 102 back to the valve mechanism and thence to the pump. By reversing the valve, the fluid will flow through the pipe 102 to the opposite end of the cylinder and will escape by pipe 101 to the valve mechanism and pump. The stem 106 of the valve projects beyond the ends thereof, and arms 107 and 108 bear on the opposite ends of this stem. These arms are formed at the ends of a rod 109 which is adapted to be shifted by means of a double lever 110 provided with an arm 111 engaging the rod 109. In order that the valve may be returned to mid position whenever free to do so, springs 112 are interposed between shoulder 113 on the rod and adjustable shoulders or abutments 114 on the valve casing.

In making a cut with our improved machine, the position of the carrier frame on the column 9 is first adjusted, so as to bring the cutter head into the proper vertical position; and the chain 51 is securely anchored in any suitable manner at points adjacent to the sides or head of the entry. Then, by the operation of the driving wheel 69 (see Figs. 4 and 6), the cutter head is adjusted over to one side of the heading or entry to make what is termed a "sump cut." As soon as the cutter head has been adjusted, the whole machine is moved forward, forcing the cutter head into the coal (cutting as it goes in), until the desired depth has been attained. The machine is then made stationary by the brake or other suitable means, and the clutch 81 is shifted so that shaft 70 and feed wheel 69 will be operated by the sprocket wheel 79. In this feed movement the cutter head is carried along across the face of the coal, the conveyer arm 22 swinging with the movement of the cutter head, and being gradually moved out along the carrier frame by the proper operation of the valve mechanism heretofore described. All material which is cut will be carried out from the cut and delivered by the several conveyers into a car or upon the "gob," as it is termed. As soon as a cut has been finished, the clutch 81 is shifted, so that pinions 85 and 86 are brought into operation, to effect a return movement of the cutter head and also of the conveyer arm.

The frame of the machine which carries all of the movable parts is pivoted on the column 9, and the entire frame is caused to turn on its pivot by the turning of the drive-wheel 69 which engages the chain 51. Power is imparted to this wheel 69 from the motor 27 through shaft 33, bevel gears 36, 37, shaft 38, sprocket connection 82, 83, 84, shaft 80, sprocket connection 78, 79, shaft 77, worm gear 71, 72, shaft 70. As the whole frame thus turns on its pivot, the conveyer arm 22 is caused to advance and carry the cutter-head outwardly with respect to the column 9 and, as the cutter arm 22 moves outward, it carries the cutter-head outward to its work. This outward advance of the cutter head is effected by pump 32 acting on the piston in cylinder 26, the pump being operated by motor 27, through shaft 28, sprocket 29, and shaft 30, with its crank-pin 31. The cutter chain with its picks is driven from the motor 27 through shaft 33, bevel gears 36, 37 and sprocket wheel 44. The conveyer chain 93 is driven from the motor 27 by shaft 28, sprocket chain 29, shaft 30, bevel gears 100, shaft 99, and sprocket connection 96, 97, 98. The raising and lowering of the cutter head is effected by the turning of the nut 10 upon the column 9. This is done by the pawl 12 whose action upon the ratchet 11 is manually controlled by a shiftable sleeve 18. Driving power is imparted to the pawl from the shaft 99 as is indicated in Fig. 10, this shaft 99 being driven, as is just explained, from the motor 27.

It is characteristic of our improved machine that the cutter head can be adjusted, so as to cut along any desired height. Furthermore, the height can be varied during the cutting operation, and thus bands or streaks of any thickness may be cut out, whether of slate or of black rash lying immediately above the coal and under the overlying roof strata. After such foreign matters have been taken away, the coal will need little picking or cleaning.

In the foregoing specification we have described a coal-mining machine which in its construction embodies our present invention; it will be understood, however that the invention is not limited to machines for that particular work, but is applicable to excavating machinery generally.

It will also be understood that the specific details of construction which we have described are not essential to our invention in its broader aspect, but that these details may be varied, and the spirit of the invention retained.

We claim herein as our invention:

1. In an excavating machine, the combination of a base or support, an arm carried by and vertically movable upon said base or support, a cutting instrument carried by said arm, a motor carried by said arm, means operated by said motor for moving said cutting instrument, and means operated by said motor for moving said arm vertically upon said base, substantially as described.

2. In an excavating machine, the combination of a base or support, an arm carried by said base or support and movable in vertical and in horizontal directions, a motor carried by said arm, a cutting instrument carried by said arm, means operated by said motor for moving said cutting instrument, means operated by said motor for moving said arm vertically upon said base, and means operated by said motor for swinging said arm horizontally upon said base, substantially as described.

3. In an excavating machine, the combination of a base or support, an arm carried thereby and vertically movable thereon, a cutting instrument carried by said arm, a motor carried by said arm, and by its movement imparting motion both to said cutting instrument in said arm, and to said arm in said base, and means for changing the relative speeds at which said cutting instrument and said arm move, substantially as described.

4. In an excavating machine, the combination of a base or support, a screw-threaded column mounted on said base or support, a nut having a ratchet surface thereon, engaging the threaded surface of said column, a cutter-carrying frame pivoted on said column and resting upon said nut, a motor, a pawl, operative connection from said motor to said pawl, and a shield movable upon the ratchet surface of said nut and shielding said ratchet surface to greater or less extent from engagement by said pawl, substantially as described.

5. In an excavating machine, the combination of a base or support, a screw-threaded column mounted on said base or support, a nut having a ratchet surface thereon engaging the threaded surface of said column, a cutter-carrying frame pivoted on said column and resting upon said nut, a motor, a pawl-carrier, a double pawl shiftable to alternate operative position with respect to said ratchet-surfaced nut, operative connection from said motor to said pawl-carrier, and an annular sleeve surounding said ratchet-surfaced nut, movable thereon, and provided with an opening through which said pawl engages said nut, and with a pawl-shifting shoulder, substantially as described.

6. In an excavating machine, the combination of a base or support, a threaded column mounted on said base or support, a nut mounted on said column, a barrel having an integrally formed carrier frame supported on said nut, a conveyer-arm extensible with relation to said frame, a cutting instrument carried by said arm, and means carried by said arm for turning said nut, substantially as described.

7. In an excavating machine, the combination of a carrier-frame vertically movable upon a base or support, a conveyer-arm extensible with relation to said frame, a cutting instrument carried by said arm, means for moving said frame vertically in said base or support, and means for extending said arm with relation to said frame, substantially as described.

8. In an excavating machine, the combination of a base, a cutter-support mounted for vertical movement, pivotal movement, and a movement of extension upon said base, separate means for effecting each of the three said movements of the cutter-support, a motor carried by said cutter support, and operative connection from said motor to each of said separate means, substantially as described.

9. In an excavating machine, the combination of a base or support, a frame vertically movable and pivoted in said base, an arm extensibly mounted in said frame, a cutter-head pivoted in said arm, a cutter carried in said cutter-head, means for driving said cutter in the cutter-head, means for moving said cutter head pivotally with respect to said arm, means for effecting a movement of extension of said arm with respect to said frame, means for moving said frame vertically with respect to said base, a motor carried by said arm, and operative connection from said motor to each of said means of movement, substantially as described.

10. In an excavating machine, the combination of a base or support, an extensible cutter-support pivoted thereon, means for swinging said cutter-support on its pivot, and means for effecting the progressive extension of said cutter-support, a motor carried by said cutter-support, and operative connection from said motor to each of the two said means, substantially as described.

11. In an excavating machine, the combination of a frame, an arm extensible with relation to said frame and armed with a cutting instrument, a cylinder carried by said frame, a piston movable in said cylinder and connected to said arm, a pump, fluid connections from said pump to opposite ends of said cylinder, a valve mechanism controlling the flow of fluid to and from opposite ends of said cylinder, means for driving said pump and means for driving said cutting instrument, a motor, and operative connection from said motor to each of said several means, substantially as described.

12. In an excavating machine the combination of a carriage adapted to be brought to position and maintained stationary during operation in an excavation chamber, a frame pivoted in said carriage and armed with a cutting instrument, a traction chain secured at one end in fixed position relative to the wall to be cut away, a traction grip carried by said frame and engaging said chain, and means for operating said traction grip, substantially as described.

13. In an excavating machine, the combination of a base or support, a frame pivoted on said base or support, an arm extensible with relation to said frame, a cutter-head pivoted in said arm, means for swinging said cutter-head pivotally, and means for extending said arm with relation to said frame, a motor carried by said arm, and operative connection from said motor to each of said several means, substantially as described.

14. In an excavating machine, the combination of a carriage, a frame pivoted in said carriage, an arm extensibly mounted with relation to said frame, a cutter-head pivoted in said arm, a cutter carried in said cutter-head, means for driving said cutter in the cutter-head, means for swinging said cutter-head pivotally with relation to said carriage, and means for effecting a movement of extension of said cutter head with respect to said carriage, a motor carried by said arm, and operative connection from said motor to each of said means of movement, substantially as described.

15. In an excavating machine, the combination of a cutter-head provided with a conveyer shelf, an endless chain mounted on said head above said shelf, a cutter secured to said chain, and a sweeping blade secured to said chain and movable along said shelf, substantially as described.

16. In an excavating machine, the combination of a frame, a conveyer arm extensible with relation to said frame, a cutting instrument carried by said arm, a motor carried by said arm, a connection from said motor to said arm operating to effect extension of said arm with relation to said frame, and an operative connection from said motor to said cutting instrument, substantially as described.

17. In an excavating machine the combination of a hollow arm, a cutting instrument carried by said hollow arm, a shaft extending through said hollow arm and rotatably mounted therein, a conveyer blade carried on said shaft, and operative connection from said shaft to said cutting instrument, substantially as described.

18. In an excavating machine the combination of a base or support, a conveyer arm movable thereon, a cutting instrument carried by said arm, a conveyer movable within said arm, means for operating said conveyer, and means for extending said arm, a motor carried by said extensible arm, and operative connection from said motor to each of said means, substantially as described.

19. In an excavating machine, the combination of a base or support, a carrier-frame movably mounted on said base or support, a conveyer arm extensible with relation to said frame, a cutter-head pivoted to said arm cutters movable upon said cutter-head, means for moving said frame, means for extending said arm with relation to said frame, means for swinging said cutter head, means for operating the cutters carried by said cutter head, means for moving the excavated material through the said conveyer-arm, substantially as described.

20. In an excavating machine, the combination of a base or support, a conveyer-arm carrying a cutter and extensibly supported by and with relation to said base, a conveyer extending in said arm, a plurality of discharge openings in said arm and coming successively to operative position as said arm is extended, a conveyer supported by said base and extending beneath the operative discharge orifice in said arm, a conveyer chain in said last-named conveyer, means for driving said cutter and means for driving said conveyer chain, said several means being coördinated to simultaneous operation, substantially as described.

21. In an excavating machine, the combination of a frame, an arm extensible with relation to said frame and carrying a cutting mechanism, a motor carried by said extensible arm and driving said cutting mechanism, a shaft mounted in said frame, operative connection from said motor to said shaft, and arm-extending means operating on the rotation of said shaft, substantially as described.

22. In an excavating machine, the combination of a base or support, a frame carried by and vertically movable upon said base or support, an arm carried by and extensible with relation to said frame and equipped with cutting means, a motor carried by said arm and driving said cutting means, a shaft mounted in said frame, operative connection between said motor and said shaft, and means operating on the rotation of said shaft for moving said frame vertically upon said base, substantially as described.

23. In an excavating machine, the combination of a base or support, a cutter-support pivoted on said base or support, a cutter head pivoted in said cutter-support, a traction chain, a chain-gripping device carried by said cutter head, and means for driving said chain-gripping device, substantially as described.

In testimony whereof, we have hereunto set our hands.

HOWARD N. EAVENSON.
FREDERICK D. BUFFUM.
JEFFERSON E. FLEXNER.

Witnesses:
  E. N. WARDEN,
  WM. N. WOODBURY.